May 29, 1928.
H. E. FREDERICKSON
1,671,708
PISTON AND CONNECTING ROD
Filed Oct. 28, 1926  2 Sheets-Sheet 1
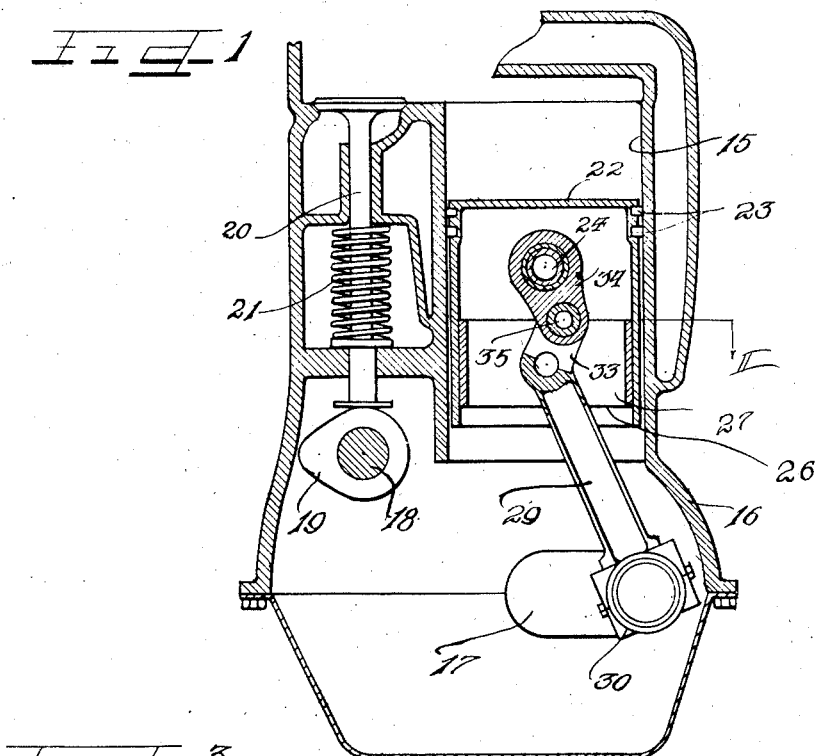
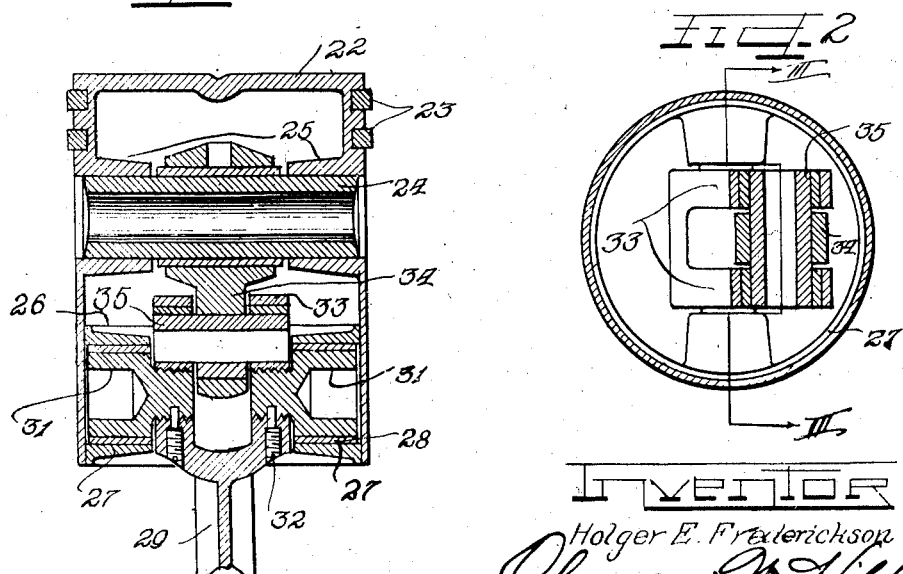
INVENTOR
Holger E. Frederickson
Charles H. Hill
Attys May 29, 1928.  1,671,708
H. E. FREDERICKSON
PISTON AND CONNECTING ROD
Filed Oct. 28, 1926   2 Sheets-Sheet 2
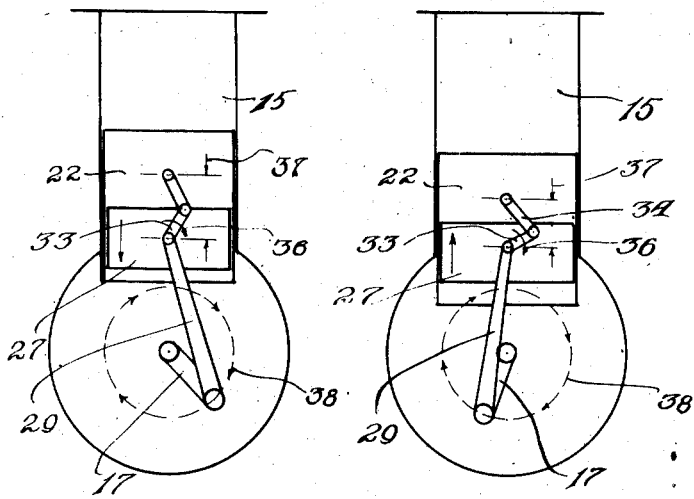
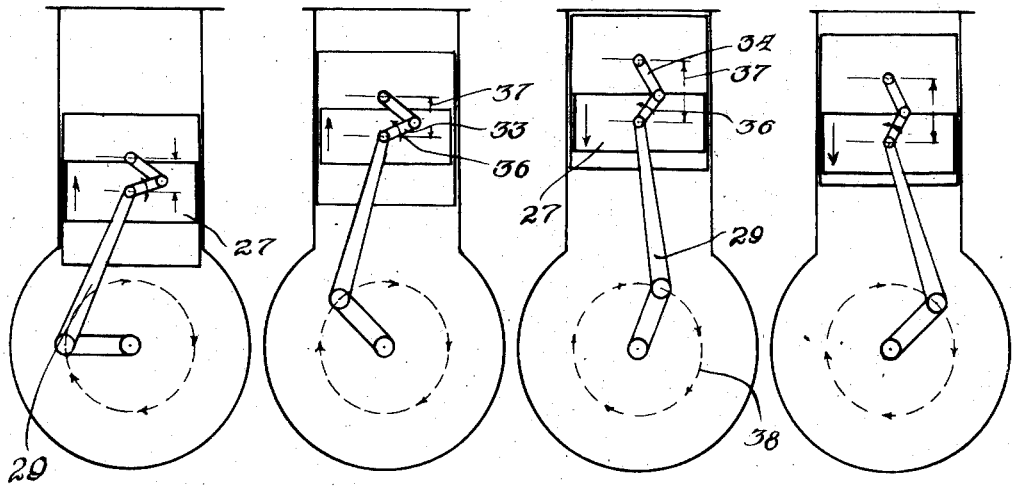
Inventor
Holger E. Frederickson
By Charles F. Hill
Atty Patented May 29, 1928.

1,671,708

UNITED STATES PATENT OFFICE.

HOLGER E. FREDERICKSON, OF CHICAGO, ILLINOIS, ASSIGNOR OF THIRTY-FIVE ONE-HUNDREDTHS TO KARL BIRGER WOSSE, OF CHICAGO, ILLINOIS.

PISTON AND CONNECTING ROD.

Application filed October 28, 1926. Serial No. 144,677.

This invention relates to a connecting rod linkage between the crankshaft and piston of internal combustion engines of all types and sizes, and is especially adapted for use in engines having small cylinder bores.

It is an object of this invention to provide an improved connecting rod linkage altering the normal harmonic motion of the piston to increase the time interval for a given piston movement in one part of the cycle and correspondingly decrease the time interval for the balance of the cycle to increase the efficiency of the cycle as a whole.

One method of accomplishing this object is to form a bell crank at the wrist pin end of the connecting rod, the crank pivot forming a crosshead, and linking this crosshead with the piston proper by linkage varying the movement of the piston relative to the crosshead. The advantage of this arrangement lies in providing more time for parts of the cycle which will be benefited thereby and reducing the time for other parts such as the compression stroke wherein speeding up reduces leakage and obtains higher compression with a curve exponent approaching more nearly that of an adiabatic compression.

On the drawings:

Figure 1 is a cross section through the cylinder of an engine embodying the features of this invention.

Figure 2 is a section through the piston on the line II—II of Figure 1.

Figure 3 is a section on the line III—III of Figure 2.

Figures 4 to 10 inclusive are diagrammatic representations of the successive relative movements of the piston and connecting rod during one revolution of the crankshaft.

As shown on the drawings:

A cylinder 15, crankcase 16, crankshaft 17 assembly is shown in Figure 1 together with a camshaft 18, cam 19, valve 20 and valve spring 21, all these parts being conventional showings for illustrative purposes, as the details thereof have no bearing on the subject-matter of the invention.

A piston 22 reciprocates in the cylinder 15 and is provided with the usual piston rings 23 and piston pin 24 supported in pin bosses 25 in the piston. The lower inner part of the piston is bored out to receive a crosshead 26 which is simply an open ended piston movable within the piston proper and having similar pin bosses 27 which may be bushed as shown at 28.

A bell crank connecting rod 29 has the usual big end 30 and shank construction, the pivot of the bell crank holding two stub pins 31 locked in place in the pivot by the screws 32 and journaled in the crosshead pin bosses 27. The two piece pin construction has been adapted simply to provide greater bearing area than would otherwise be available due to the short centers of the linkage connecting the crosshead and piston pin 24, and to provide a compact structure within the piston proper, whereby the same may be used in small bore engines. The bell crank pivot corresponds to the piston pin location of a conventional connecting rod, the crank 33 above the pivot being offset at an angle and bifurcated to receive a short link 34 fixed on a pin 35 to which the furcations of the bifurcated crank 33 are pivoted. The link 34 is pivoted on the pin 24 in the piston proper. The angular offset of the crank 33 is preferably approximately 45° to the axis of the connecting rod but this angle may be varied in individual installations to provide the best compromise between the side thrust produced and the desirable relative movement between the crosshead and piston.

In the operation of the above described mechanism the chief results lie in an alteration of the top and bottom dead center points of the piston relative to the crank shaft position, as shown in Figures 9 and 5, respectively; and in varying the speed of piston travel, slowing down the initial movement from either extreme and speeding up the final movement approaching either extreme.

This varying rate of piston travel as contrasted with simple harmonic motion gives more time for charging on the first part of the inlet stroke and for ignition and initial combustion while giving a snappier completion of the compression and exhaust strokes in the case of a four stroke cycle.

Similar advantages exist in the case of a two cycle engine, the time for ignition and expansion being prolonged while exhaust and compression are speeded up.

A consideration of the diagrammatic showings of Figures 4 to 10 of successive steps in a cycle, will demonstrate the foregoing. Starting with Figure 9 at top dead center for the piston, the crank shaft has already passed dead center, so that ignition at this point does not strain the mechanism due to catching the crank on dead center. The arrow 36 shows that the crank 33 is swinging anti-clockwise so that the piston proper is moving downwardly more slowly than the crosshead as shown by the double arrows 37, thus giving more time for ignition and expansion. In Figure 10 this movement continues until the crank pin is horizontal after which the direction of swing of the crank 33 reverses, as shown in Figure 4, and the piston gains on the crosshead, as shown by the arrows 37. This movement is carried forward until the crank pin is again horizontal in a position opposite to the first position when the direction of swing again reverses as shown in Figure 8, and the piston again lags behind the crosshead.

I am aware that many changes may be made, and numerous details of construction may be varied through a wide range without departing from the principles of this invention, and I, therefore, do not purpose limiting the patent granted hereon, otherwise than necessitated by the prior art.

I claim as my invention:

1. In a device of the class described, a piston, a hollow piston pin therein, a connecting rod, a bifurcated crank on said connecting rod and angularly related thereto, a crosshead, a pair of spaced recessed stub pins journaled in said crosshead, one of said stub pins being threadedly connected to each furcation of said crank, and toggle mechanism connecting said crank with said piston pin.

2. In an internal combustion engine, a piston, a piston pin, a connecting rod, an angular bifurcated portion on said connecting rod, a crosshead in said piston, a pair of stub pins journaled in said crosshead, one of said stub pins being securely fixed to each furcation of said bifurcated portion, a short pin pivotally carried by said bifurcated portion, and a link fixed to said short pin and pivotally connected to said piston pin.

3. In a device of the class described, a piston, a hollow piston pin therein, a piston-type crosshead slidable in the lower portion of said piston, a connecting rod, a bifurcated crank on said connecting rod and angularly related thereto, a pair of oppositely disposed and recessed stub pins journaled in said crosshead, one of said stub pins secured to each furcation of said crank, means for rendering said securement positive, a hollow pivot pin pivotally carried by the furcations of said crank, and a connecting link pivoted to said piston pin and connected to said pivot pin, said link extending within said furcations and between said stub pins.

In testimony whereof I have hereunto subscribed my name.

HOLGER E. FREDERICKSON.